United States Patent [19]
Frizot

[11] Patent Number: 5,046,386
[45] Date of Patent: Sep. 10, 1991

[54] APPARATUS FOR SCREWING AT LEAST ONE NUT ONTO AND OFF CONNECTION MEMBERS

[75] Inventor: Alain Frizot, Montcenis, France

[73] Assignee: Framatome, Courbevoie, France

[21] Appl. No.: 414,151

[22] Filed: Sep. 27, 1989

[30] Foreign Application Priority Data

Sep. 27, 1988 [FR] France .................... 88 12604

[51] Int. Cl.⁵ ............................................. B25B 29/02
[52] U.S. Cl. .................................... 81/57.38; 29/723; 29/795
[58] Field of Search ............ 81/57.38; 29/426.5, 29/525.1, 723, 795; 254/29 A

[56] References Cited

U.S. PATENT DOCUMENTS

| | | | |
|---|---|---|---|
| 3,877,326 | 4/1975 | Köck et al. | 81/57.38 |
| 4,027,559 | 6/1977 | Wallrafen | 81/57.38 |
| 4,047,456 | 9/1977 | Scholz | 81/57.38 |

FOREIGN PATENT DOCUMENTS 0003326 8/1979 European Pat. Off. .
3318941 11/1984 Fed. Rep. of Germany .
0116488 1/1983 France .

Primary Examiner—D. S. Meislin
Attorney, Agent, or Firm—Pollock, Vande Sande & Priddy

[57] ABSTRACT

Apparatus for screwing on and off a clamp nut (5) and an extension piece (13) facing the clamp nut. The extension piece (13) of each of plurality of connection members (2) cooperates with a ring (1) for simultaneously tensioning the connection members. The apparatus includes a carriage (20) for guiding and displacing the apparatus around the ring (1) tensioning the connection member (2), a disengageable system (30) for displacing and rotationally driving the extension piece (13) which is to be screwed on or off, and a disengageable system (40) for rotationally driving the clamp nut (5) which is to be screwed on or off. These systems are supported by the carriage (20) and are displaceable along an axis parallel to the axis of the connection member (2) and at a speed identical to that of the nut (5) or of the extension piece (13) in the course of its screwing or unscrewing.

14 Claims, 5 Drawing Sheets

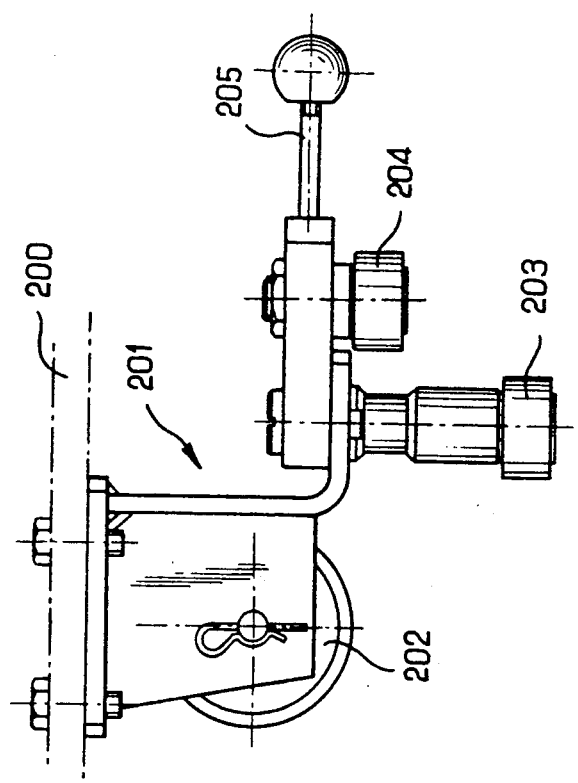
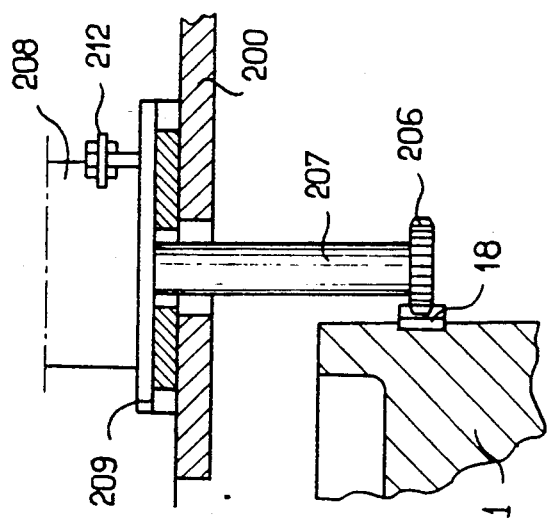
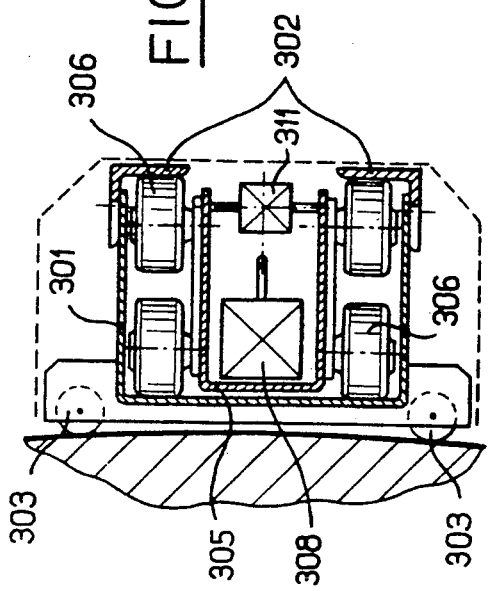
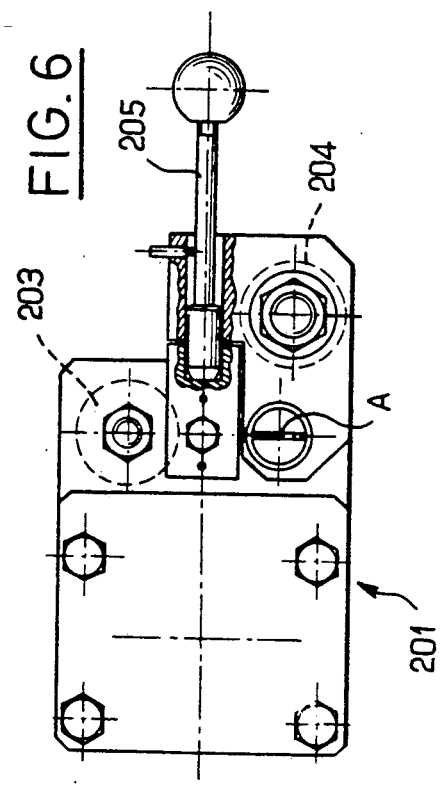

APPARATUS FOR SCREWING AT LEAST ONE NUT ONTO AND OFF CONNECTION MEMBERS

FIELD OF THE INVENTION

The present invention relates to an apparatus for screwing or unscrewing at least one nut onto or off connection members.

BACKGROUND OF THE INVENTION

In industrial installations utilizing screwed connection members, traction is generally applied to said members with the aid of a tensioning device for the purpose of holding them in a prestressed state, and while this traction is applied, a nut holding the connection member in position is screwed on or off.

This is in particular the case with pressure vessels used in industry, especially the nuclear, chemical or petrochemical industries, wehere it is necessary to screw or unscrew a clamping and holding nut onto or off each connection member consisting, for example, of a bolt, while applying traction with the aid of an appropriate device to all said connection members with the aid of a tensioning nut also screwed onto each connection member.

This is also the case in the automobile and aeronautical industries, in which numerous screwed connection members are used.

These connection members are generally used in fairly large numbers and relatively close to one another, so that on every intervention it is necessary to screw on or off both the tensioning nut and the holding nut on each connection member.

These operations of successively screwing or unscrewing the different nuts are lengthy and delicate, and can only be carried out automatically.

SUMMARY OF THE INVENTION

The aim of the present invention is therefore to provide an apparatus for the automatic screwing and unscrewing, onto or off connection members, of nuts disposed facing one another, which facilitate operating procedures without thereby impairing the intrinsic safety of the apparatus and its environment.

One object of the invention is thus an apparatus for screwing or unscrewing, onto or off a plurality of connection members, a clamp nut and an extension piece disposed facing each other, said extension piece of each connection member cooperating with a ring for simultaneously tensioning said connection members. The apparatus comprises:

a carriage for the guiding and displacement of said apparatus around the ring tensioning the connection members, disengageable means for the displacement and rotational driving of the extension piece which is to be screwed on or and, disengageable means for the rotational driving of the clamp nut which is to be screwed on or off, said means being supported by the carriage and being displaceable along an axis parallel to the axis of the connection member and at a speed identical to that of the nut or extension piece moving in the course of its screwing or unscrewing.

BRIEF DESCRIPTION OF THE DRAWINGS

The invention will be better understood with the aid of the following description, which is given solely by way of example and with reference to the accompanying drawings, in which:

FIG. 4 is a view in section on the line 4—4 in FIG. 2.

FIG. 5 is a front elevation of the support and guide carriage of the apparatus.

FIG. 6 is a top plan view of FIG. 5.

FIG. 7 is a schematic view in section of the mechanism driving the apparatus around the tensioning ring.

DESCRIPTION OF PREFERRED EMBODIMENT

Figure 1:
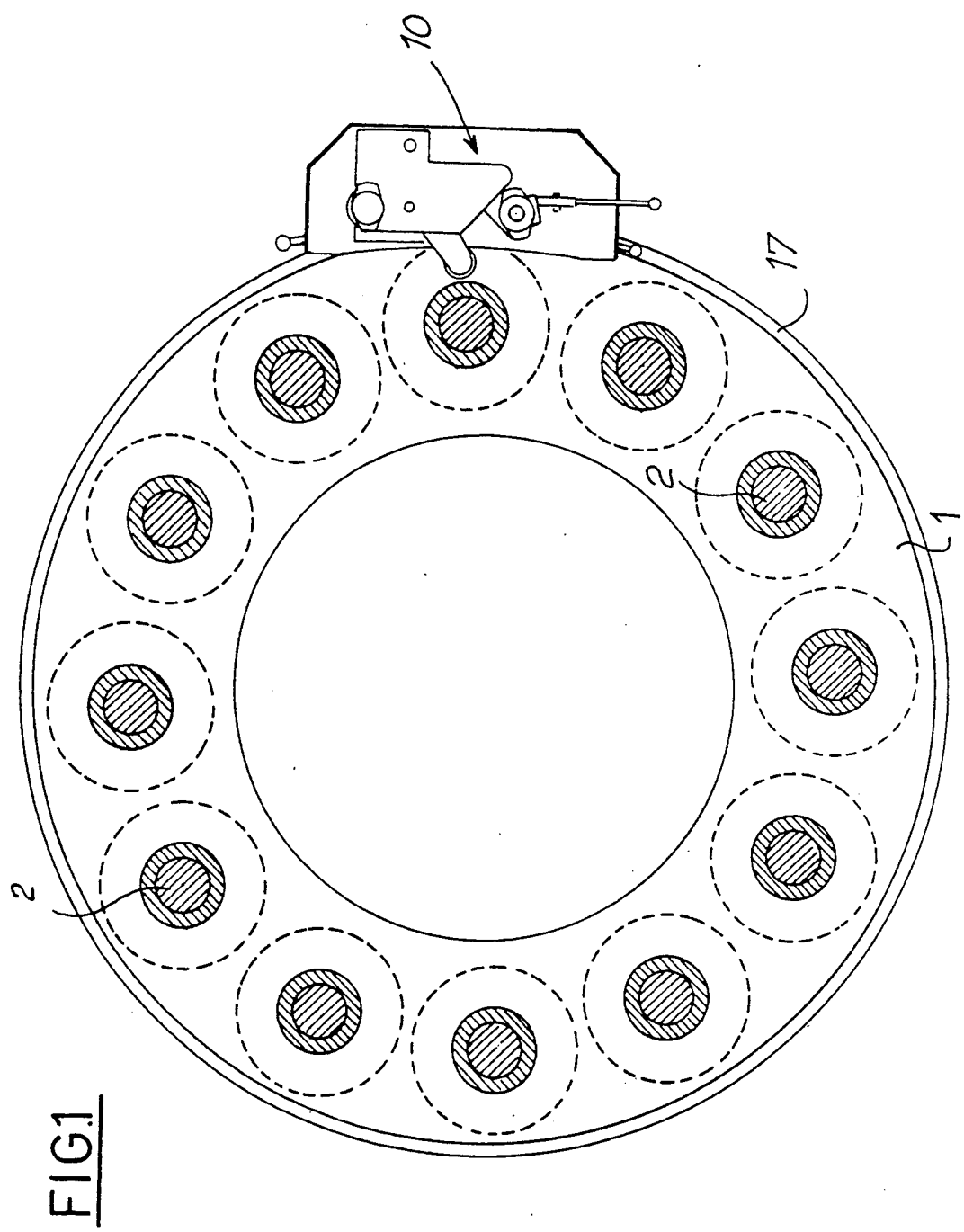
FIG. 1 is a schematic top plan view of a ring which tensions the connection members and on which the screwing and unscrewing apparatus according to the invention is displaced.

FIG. 1 shows a ring 1 for the simultaneous tensioning of a plurality of connection members 2, which for example consist of bolts of large dimensions whose axis is vertical.

These connection members 2 are intended to hold a flange 3, for example, on a fixed flange 4 of a pressure vessel or casing (FIG. 2), on the periphery of which said connection members 2 are regularly spaced.

The circular flange 3 is applied against the fixed flange 4 by means of the connection members 2, which for that purpose are each locked by a clamp nut 5. Each clamp nut 5 is provided with a toothed crown 5a.

The tensioning ring 1 is circular and comprises as many cylinders 6 as there are connection members 2. These cylinders 6, cut in the mass of the ring 1, are equidistant from one another and are each provided with a piston 7 equipped with sealing means functioning with the aid of a pressurized fluid.

During the operations of tensioning the connection members and of screwing or unscrewing, the flange 3 is suspended from the flange 4 with the aid of connection means 8 consisting, for example, of small rods. Similarly, the tensioning ring 1 is suspended under the flange 3 with the aid of connection means, consisting for example of small rods, attached to spacers 11 which are fixed on the ring 1 with the aid of nuts and bolts 12.

On the threaded end of the connection member 2 is screwed, facing the clamp nut 5, an extension piece 13 which passes through the piston 7 and carries at its opposite end a nut 14 provided with a washer 15 having a spherical bearing surface. In addition, the extension piece 13 has at its base two pins 16 intended to transmit the circular screwing or unscrewing movement, as will be seen later on.

The tensioning ring 1 is equipped on its periphery with a running track 17, attached to it or machined in its mass, over which the screwing and unscrewing apparatus given the general reference 10 is displaced.

The screwing and unscrewing apparatus is composed of three sub-assemblies:

a carriage 20 for support and guidance on the running track 17 of the entire apparatus, a system 30 for screwing the extension piece 13 onto and off the connection end 2, and a system 40 for screwing on or off the clamp nut 5.

Referring first to FIGS. 2, 3, 5 and 6, the carriage 20 will be described.

The carriage 20 is composed of a horizontal plate 200, under which two bogies 201 (FIGS. 3, 5 and 6) are fixed by known connection means (not shown).

Each bogie 201 comprises a carrier roller 202, a fixed roller 203 rolling horizontally on the outside of the running track 17, and an adjustable roller 204 running horizontally on the inside of said running track.

The adjustable roller 204 is mounted on a lever pivoting about a vertical axis A (FIGS. 3 and 6) and indexable in the working position by means of a rod 205.

Figure 3:
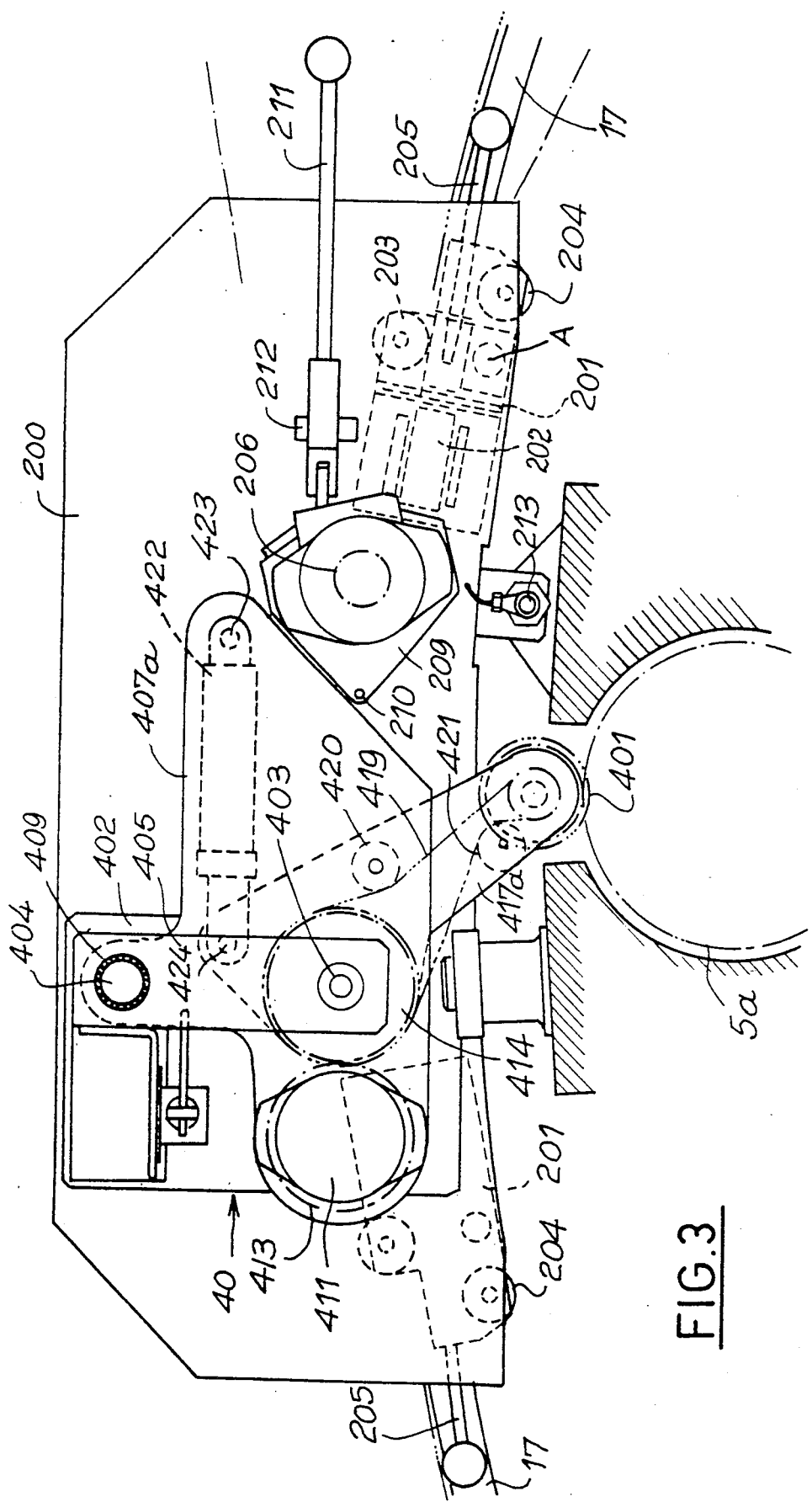
FIG. 3 is a top plan view of the apparatus according to the invention.

The peripheral displacement of the carriage 200 and of the entire apparatus around the tensioning ring 1 is effected with the aid of a sprocket wheel 206 mounted at the end of a shaft 207 of a hydraulic motor 208 (FIG. 7). This sprocket wheel 206 is fastened to a base 209 mounted for pivoting about a vertical pivot 210 provided on the plate 200 (FIG. 3).

The sprocket wheel 206 engages with a roller chain 18 fixed in a groove machined in the periphery of the tensioning ring 1.

The pivoting of the base 209 about the pivot 210 is controlled by a lever 211, thus enabling the sprocket wheel 206 to be disengaged from the chain 18 when the apparatus has to be dismantled, and for operating purposes the lever 211 is locked in an adjustable stop 212 (FIG. 3) in such a manner as to hold the sprocket wheel 206 in engagement with the peripheral chain 18.

The peripheral indexing of the entire apparatus 10 around the tensioning ring 1 is effected by the carriage 20, which for that purpose is provided with a proximity sensor 213 (FIGS. 2 and 3) fixed to the end of an angle section 214 fastened to the plate 200. The sensor 213 is provided with two nuts 215 enabling it to be adjusted vertically.

The sensor 213 cooperates with a receiver target 216 formed by the head of a screw 217 mounted in a tapped sleeve 218 which is screwed onto an extension of the outer fastening bolt 12 of each of the spacers 11.

The apparatus thus has a single sensor fastened to the carriage 20 and as many receiver targets as there are connection members 2. The operating clearance between the sensor 213 and the receiver target 216 is regulated by means of the screw 217.

Figure 2:
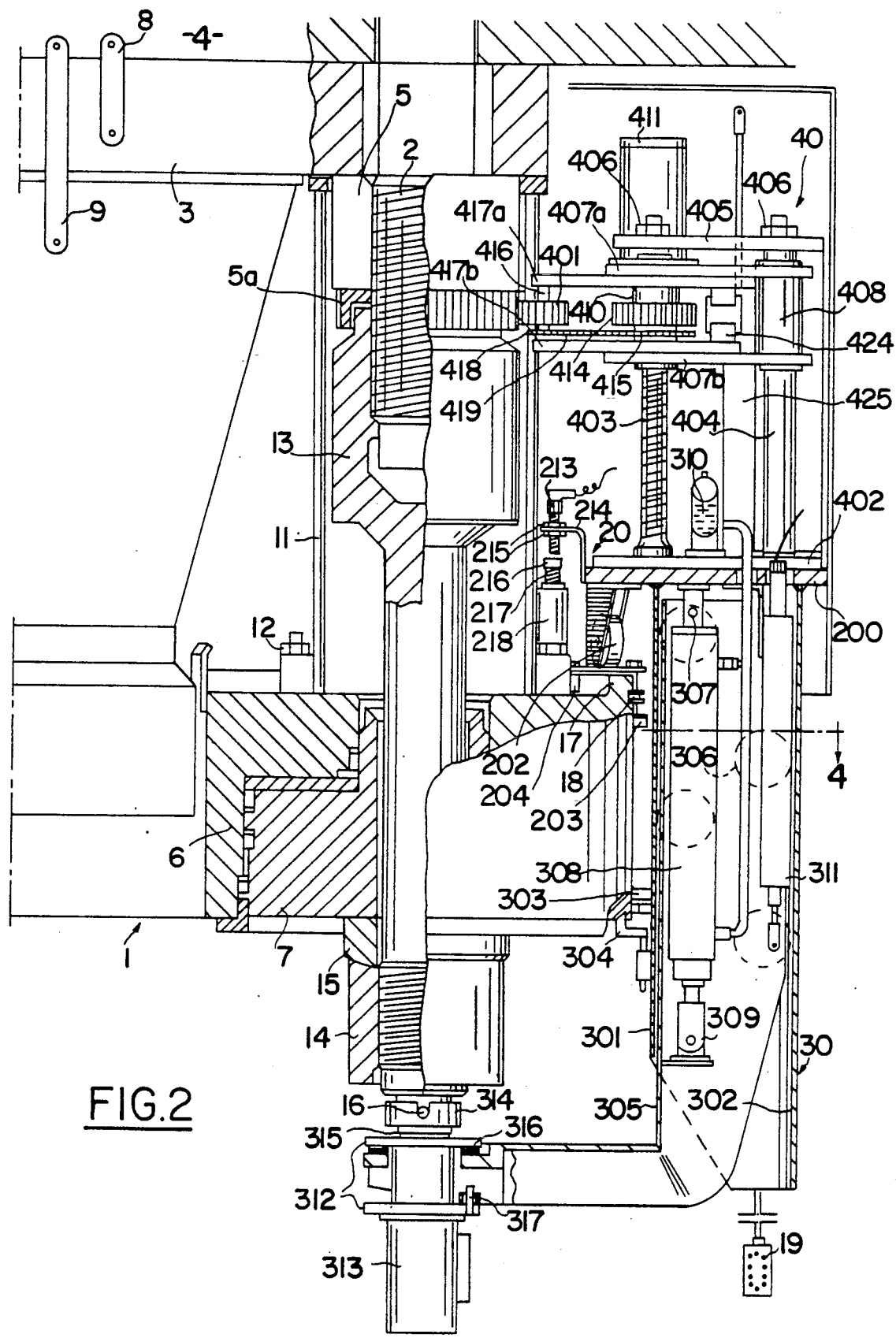
FIG. 2 is a front elevation of the entire apparatus according to the invention.

A description will now be given, with reference to FIGS. 2 and 4, of the system 30 for screwing the extension piece 13 onto or off the end of the connection member 2.

This system comprises a fixed slideway 301 having the shape of a horizontal U and made of metal, which is attached to the plate 200, for example by welding. A detachable, adjustable slideway 302 is fixed on the end of each branch of the slideway 301.

The fixed slideway 301 is also provided at mid-height with, on the one hand, two complementary rollers 303 having vertical axes and rolling on the side face of the ring 1, and on the other hand with a retractable catch 304 (FIG. 2), which takes up position in a peripheral groove in the ring 1. The catch 304 permits positioning without taking any reference into account.

Inside the slideways 301 and 302 is mounted a compensation arm 305, which comprises a vertical part and a horizontal end. The vertical part of the compensation arm 305 is provided with rollers 306, which enable said arm to slide without friction in the assembly consisting of the slideways 301 and 302.

The compensation arm 305 is suspended under the plate 200 by means of an eye 307, under which is attached a double action hydraulic jack 308, which is in turn fixed to the arm 305 by an eye 309. The jack 308 is connected to a pneumo-oil accumulator 310.

The vertical position of the compensation arm 305 is detected by a rectilinear potentionmeter 311, of which one end is fixed to the plate 200 and the other to the arm 305.

The horizontal end of the compensation arm 305 supports, via an end plate 312, a hydraulic or other motor 313, which drives a cup 314 for screwing or unscrewing the extension piece 13 with the aid of the pins 16. The cup 314 rests on a thrust ball bearing 315, and the end plate 312 rests on a self-lubricating washer 316. The end plate 312 is mounted with sufficient radial clearance to enable the assembly consisting of the end plate 312, the motor 313, and the cup 314 to be self-aligning with the reference axis of the extension piece 13.

A pin 317 housed in a circular socket in the arm 305 holds the end plate 312 in position so as to prevent any rotary movement when the motor 313 is started up.

The screwing or unscrewing system 40 (FIGS. 2 and 3) serves the purpose of transmitting a rotary movement to the clamp screw 5 by means of a pinion 401 driven by a motor unit fixed on the carriage 20.

For this purpose, this system comprises a base 402 fixed on the plate 200, a worm 403 whose pitch P2 is equal to the pitch of the clamp nut 5, reversed, and a smooth shaft 404. The worm 403 and the shaft 404, which are vertical, are fixed by their bottom ends in the base 402 and are connected at their tops by a bar 405 secured with the aid of nuts 406.

The system also comprises two end plates 407a and 407b connected together at one end by a sleeve 408 mounted on the smooth shaft 404 by means of a ball bush 409, so that said sleeve can slide effortlessly along the shaft 404. The other end of the end plates 407a and 407b is mounted for free rotation on a sleeve 410 screwed on the worm 403 by means of an internal screwthread of the pitch P2, left-handed.

The top end plate 407a supports a hydraulic motor 411 whose shaft 412 (FIG. 8) drives rotationally a gear 413 disposed under the end plate 407a. This gear 413 meshes with a gear 414 keyed on the sleeve 410, which in turn is fastened for rotation with a sprocket wheel 415.

In addition, the pinion 401 is keyed on a shaft 416 mounted for free rotation between two small end plates 417a and 417b disposed between the end plates 407a and 407b. Moreover, the end plates 417a and 417b are mounted for free rotation on the sleeve 410.

Figure 8:
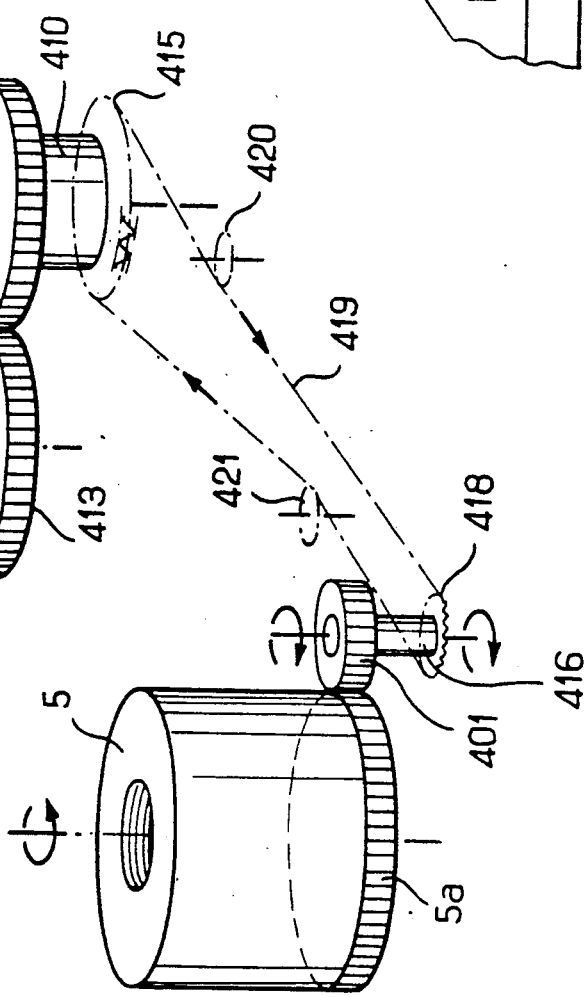
FIG. 8 is a schematic view in perspective of the gear train for screwing or unscrewing the clamp nut onto or off the connection member.

A sprocket wheel 418 is also mounted on the shaft 416 for rotation with the latter and is connected to the sprocket wheel 415 on the sleeve 410 by a roller chain 419 equipped with tensioners 420 and 421 (FIGS. 3 and 8).

The assembly comprising the small end plates 417a, 417b, the pinion 401, the shaft 416 and the sprocket wheel 418 is pivotable about the sleeve 410 under the action of a jack 422 (FIG. 3), in order to enable the pinion 401 to come into contact with the toothed crown 5a on the clamp nut 5.

The jack 422 has one of its ends fixed on a shaft 423 fastened to the end plates 407a and 407b, while its other end is fixed on a shaft 424 fastened to the small end plates 417a and 417b.

Figure 9:
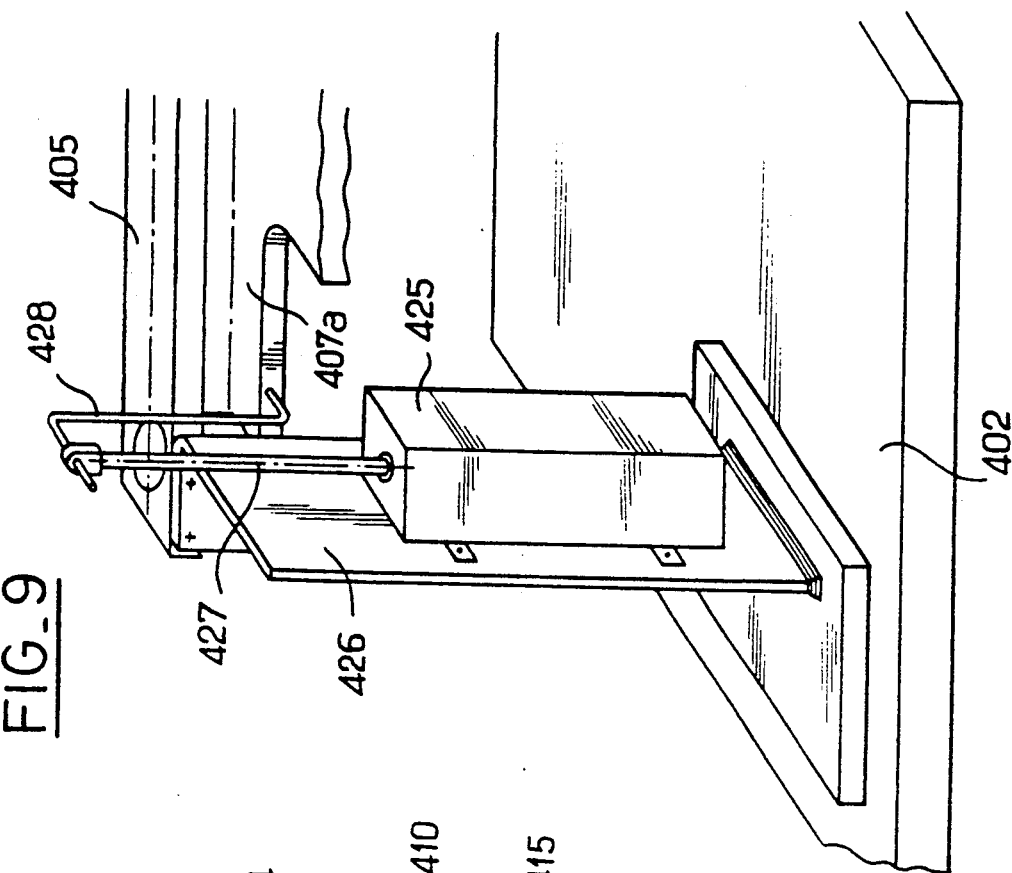
FIG. 9 is a schematic view in perspective of the system detecting the position of the gear train for screwing or unscrewing the clamp nut.

As shown in FIG. 9, the vertical position of the pinion 401 can be ascertained at any moment with the aid of a potentiometer 425. This potentiometer is fixed on a vertical plate 426 fastened to the base 402 and to the bar 405, said plate 426 also serving as a stiffener for the worm 403 and the shaft 404.

The cursor 427 of the potentiometer 425 is operated by a rod 428 connected to the top end plate 407a and following the displacements of the pinion 401.

The different systems are controlled by a button panel 19 (FIG. 2) moving with the carriage 20.

The operation of the device thus described is as follows:

After the connection members 2 have been screwed onto the fixed flange 4 and the flange 3 has been placed on said fixed flange 4, with the aid of small connecting rods 8, the clamp nut 5 is screwed onto the threaded end of each connection member 2.

This screwing is, for example, effected with the aid of an electric or pneumatic screwing device (not shown), whose torque is set to a relatively low value enabling the screwing to be stopped as soon as the nut 5 comes into contact with the flange 3.

Once this operation has been carried out on all the connection members 2, the extension piece 13 is engaged on the threaded end of each of said connection members, and then the ring 1, supported by the flange 3 with the aid of the spacers 11, is placed in position. The free ends of the extension pieces 13 pass with clearance through the pistons 7 of the ring 1.

Each extension piece is then fully screwed in by the automatic screwing apparatus 10.

For this purpose the sprocket wheel 206, is engaged in the roller chain 18 with the aid of the lever 211. The motor 208 drives the sprocket wheel 206 and the entire apparatus moves on the running track 17 with the aid of the bogies 201.

As soon as the sensor 213 arrives opposite a receiver target 216, the motor 208 stops, so that the end of the compensation arm 305 lies facing a connection member 2. The catch 304 is then engaged in a peripheral groove in the ring 1.

With the aid of the button panel 19, the operator operates the jack 308 to displace the arm 305 vertically in the slideways 301, 302.

The pneumo-oil accumulator 310 initially supplies a force slightly greater than the weight of the assembly comprising the extension piece 13, the nut 14 and the washer 15, thus pushing this assembly vertically in the direction towards the screwthread of the connection member 2.

The extension piece 13 is driven rotationally by the motor 313 with the aid of the cup 314 and the pins 16, and is screwed onto the threaded end of the connection member 2. As the screwing proceeds, the pneumo-oil accumulator 310 is unloaded and the thrust force decreases but does not fall below the mass of the moving assembly. The screwing is therefore effected with a very small vertical resisting force.

The arm 305 serves two purposes, namely it permits compensation for the weight of the extension piece during screwing and unscrewing operations, and it enables the extension piece to be driven rotationally by means of the motor 313 while accompanying it along its displacement at an identical speed and continuously as far as its desired position.

Once this operation has been carried out, the operator effects the lowering of the arm 305, the unlocking of the carriage 20, and the restarting of the motor 208, thus again driving the entire apparatus to the next connection member.

The screwing operation is repeated for each extension piece.

It is to be noted that the pneumo-oil accumulator 310 provides great flexibility of operation, thus ensuring a permanent thrust equal to the weight of the extension piece at the start and decreasing in proportion as the accumulator is emptied. Since the accumulator is adjusted to give a force close to the weight of the extension piece at the end of the stroke, screwing onto the last few turns of the screwthread is effected with a vertical resisting force close to zero, i.e., the bolt itself takes over the weight of the extension piece 13 as the screwing proceeds.

The floating support of the motor 313 ensures operation even if the connection member 2 is horizontally out of line in its socket.

It is possible at any moment to ascertain the height of the compensation arm 305, and the validity of the readings of the position of this arm is dependent on the permanent contact of the cup 314 under the end of the extension piece. This condition is fulfilled with the aid of the pneumo-oil accumulator 310.

When all the extension pieces have been screwed in, all the jacks of the ring 1 are simultaneously fed with operating fluid by means of an appropriate system (not shown), so as to apply traction and to tension all the connection members 2 by means of the pistons 7, the washers 15 and the nuts 14.

While all the connection members 2 are held in extension, the screwing-in of the clamp nuts 5 is completed by the screwing apparatus 10.

For this purpose the motor 208 drives the sprocket wheel 206 and the entire apparatus is displaced on the running track 17. As soon as the sensor 213 arrives opposite a receiver target 216, the motor 208 stops and the catch 304 is engaged in the peripheral groove in the ring 1, so as to hold the entire apparatus in position.

The pinion 401 is in the retracted position, and the gear train 413, 414, 401 is positioned vertically to face the toothed crown 5a on the clamp nut 5 by operating the motor 411, which turns the pinion 413, the pinion 414 and the chain 419. The pinion 414 fastened to the sleeve 410 drives the latter to turn on the worm 403, thus bringing about the displacement of the end plates 407a, 407b, 417a, 417b and the pinion 401.

As soon as the position of the pinion 401, detected by the potentiometer 425, corresponds to the position of the toothed crown 5a, the motor 411 stops automatically. The jack 422 brings about the pivoting of the end plates 417a, 417b about the sleeve 410 until the pinion 401 comes into mesh with the toothed crown 5a. In order to facilitate the engagement of the teeth, the motor 411 is restarted at the moment when contact is made. This motor drives the pinion 413, which in turn drives the pinion 414, the sleeve 410, the sprocket wheel 415 and the chain 419.

This chain in turn drives the sprocket wheel 418 and the pinion 401, which drives the toothed crown 5a, thus bringing about the screwing-in of the nut 5.

If the following designations are used:

P1 for the pitch of the nut 5,

P2 for the pitch of the worm 403 and of the sleeve 410 (left-handed),

Z 5a for the number of teeth on the toothed crown 5a,
Z 401 for the number of teeth on the pinion 401,
Z 418 for the number of teeth on the sprocket wheel 418,
Z 415 for the number of teeth on the sprocket wheel 415,
Z 414 for the number of teeth on the gear 414,
Z 413 for the number of teeth on the (driving) gear 413, the ratios being as follows:

$$Z5a = N \times Z401 \text{ and } Z415 = N \times Z418,$$

this means that the sprocket wheel 415 turns at the same speed W 415, in the opposite direction, as the toothed crown 5a.

Z 414 = Z 413.

Consequently W 414 = W 415, the pinion being rotationally connected.

W 401 = W 418, the pinion being rotationally connected.

Consequently, the driving pinion 413 turns at the same speed as the toothed crown 5a on the clamp nut 5.

It may be observed that, when the nut 5 is screwed onto the connection member 2, it rises one pitch P1 per turn, and that the sleeve 410, which turns at the same speed, drives all the end plates 407a, 407b, 417a, 417b in the same vertical direction and at the same speed of vertical displacement as the nut 5.

Consequently, the drive means consisting of the gear train completely accompanies the nut during its vertical movement, either upwards for screwing on or downwards for screwing off.

The position of the vertical axis of the pinion 401 can be ascertained at any moment with the aid of the potentiometer 425, whose cursor 427 follows the displacement of the top end plate 407a.

In the course of this operation, the shaft 404 forms a guide and a means preventing rotation when the motor 411 is started up.

As soon as the nut 5 has been screwed on, the operator stops the motor 411 and, through the action of the jack 422, retracts the pinion 401 from the toothed crown 5a.

The operation is then repeated on each clamp nut 5 by displacing the apparatus 10 on the running track 17.

The apparatus according to the invention therefore makes it possible to carry out automatically the operations of screwing and unscrewing a series of nuts disposed on the same common vertical axis, while accompanying them along their displacement. It also permits rapid intervention because the carriage stops automatically opposite each of the connection members. The compact bogies permit simple adjustment for mounting purposes and rapid disengagement of the removable rollers when it is necessary to dismount the carriage during periods of non-operation.

The catch 304 may be equipped with a pneumatic or hydraulic servo control system composed of known elements, and it protects the bogie rollers, and above all their axles, against excessive torsion when the extension piece rests on the compensation arm.

Nevertheless, this catch is equipped with an electric safety device of the proximity sensor type, preventing the carriage from moving in the event of the catch remaining engaged.

In addition, the apparatus also makes it possible to apply a constant operating torque throughout the operation, thus avoiding the creation of parasitic forces which could give rise to the heating of contacting surfaces and the bending of the free portion of the connection member.

The apparatus according to the invention is applicable in particular to vessels, pressure casings, manholes, handholes, turbines, hydraulic valves, for fastening closure members in installations, such as nuclear, petrochemical or chemical installations, in the automobile and aeronautical industries, and, in general, in numerous industrial installations utilizing screw connection members.

I claim:

1. Apparatus for screwing a clamp nut and an extension piece onto or off a plurality of connection members (2), two components comprising said clamp nut (5) and extension piece (13) of each connection member (2) cooperating with a ring (1) for simultaneously tensioning said connection members, one of said two components being moved by said apparatus relative to the other of said components, said apparatus comprising
   (a) carriage means (20) for the guiding and displacement of said apparatus around the ring (1) tensioning said connection members (2);
   (b) first disengageable means (30) for the displacement and rotational driving of the extension piece (13) which is to be screwed on or off a connection member, said first disengageable means comprising a compensation arm (305) adapted to compensate for the weight of said extension piece and movable vertically on slideways (301, 302) attached to an underside of a plate (200) of said carriage means (20), said compensation arm having a horizontal end operatively connected to said extension piece, whereby vertical movements of said compensation arm are transmitted to said extension piece; and
   (c) second disengageable means (40) for the rotational driving of said clamp nut (5) which is to be screwed on or off a connection member, said second disengageable means comprising a smooth shaft (404) and a worm (403) mounted on said plate (200), a gear train (401, 410, 414, 415, 418) displaced on said smooth shaft and worm, said second disengageable means being supported by said carriage means (20) and being displaceable along an axis parallel to an axis of said connection member (2) and at a speed identical to that of said component being moved by said apparatus relative to the other said component in the course of its screwing or unscrewing.

2. Apparatus according to claim 1, wherein said plate (200) supports at least one bogie (201) cooperating with a running track (17) provided on a periphery of said ring (1), means (206, 207, 208) for driving said carriage means around said ring (1), means (213) for indexing said apparatus around said ring, and means (304) for locking said carriage means in a fixed position on said ring.

3. Apparatus according to claim 2, wherein said bogie (201) comprises a carrier roller (202); a fixed roller (203) rolling horizontally on an outside of said running track (17), and a disengageable roller rolling horizontally on an inside of said running track.

4. Apparatus according to claim 2, wherein said drive means comprises a sprocket wheel (206) driven by a motor (208) and cooperating with a chain (18) provided on a periphery of said ring (1), said sprocket wheel (206) being mounted on said plate (200) and pivoting between a disengaged position and a position in which it meshes with said chain (18).

5. Apparatus according to claim 2, wherein said indexing means are in the form of a proximity sensor (213) which is vertically adjustable and fastened to said plate (200) and which cooperates with a receiver target (216) disposed at each connecting member (2).

6. Apparatus according to claim 1, wherein said compensation arm (305) comprises a vertical part and a horizontal part supporting means (313, 314, 315) for the rotational driving of said extension piece (13).

7. Apparatus according to claim 1, wherein said compensation arm (305) is in engagement with and vertically displaced by a double action jack (308) connected to a pneumo-oil accumulator (310).

8. Apparatus according to claim 7, wherein a first element of said jack (308) is fixed on said plate (200) and a second element of said compensation jack is fixed on said arm (305).

9. Apparatus according to claim 1, wherein said compensation arm (305) is provided with means (311) for detection of a position of said arm.

10. Apparatus according to claim 1, wherein said gear train includes a pinion (401) mounted on a shaft for pivoting movement, under the action of control means (422), between a first position in which it is tangentially engaged on said nut (5) and a second position in which it is disengaged from said nut, said pinion (401) being supported by end plates (417a, 417b) mounted for free rotation on a sleeve (410) screwed on said worm (403), ends of said end plates remote from said pinion (401) being connected to said control means (422).

11. Apparatus according to claim 10, wherein said pinion (401) is mounted on a shaft (416) free to rotate on said end plates (417a, 417b) and driven by a sprocket wheel (418) cooperating with a chain (419).

12. Apparatus according to claim 11, wherein said chain (419) is driven by a sprocket wheel (415) fastened to a sleeve (410) fixed for rotation with a pinion (414) cooperating with a second pinion (413) driven by a motor (411).

13. Apparatus according to claim 12, wherein said second pinion (413) and said motor (411) are supported by end plates (407a, 407b) mounted for free rotation on said sleeve (410) and connected together by a sleeve (408) sliding on said shaft (404).

14. Apparatus according to claim 1, comprising means (425, 427, 428) for detecting the position of said pinion (401).

* * * * *